Patented May 26, 1925.

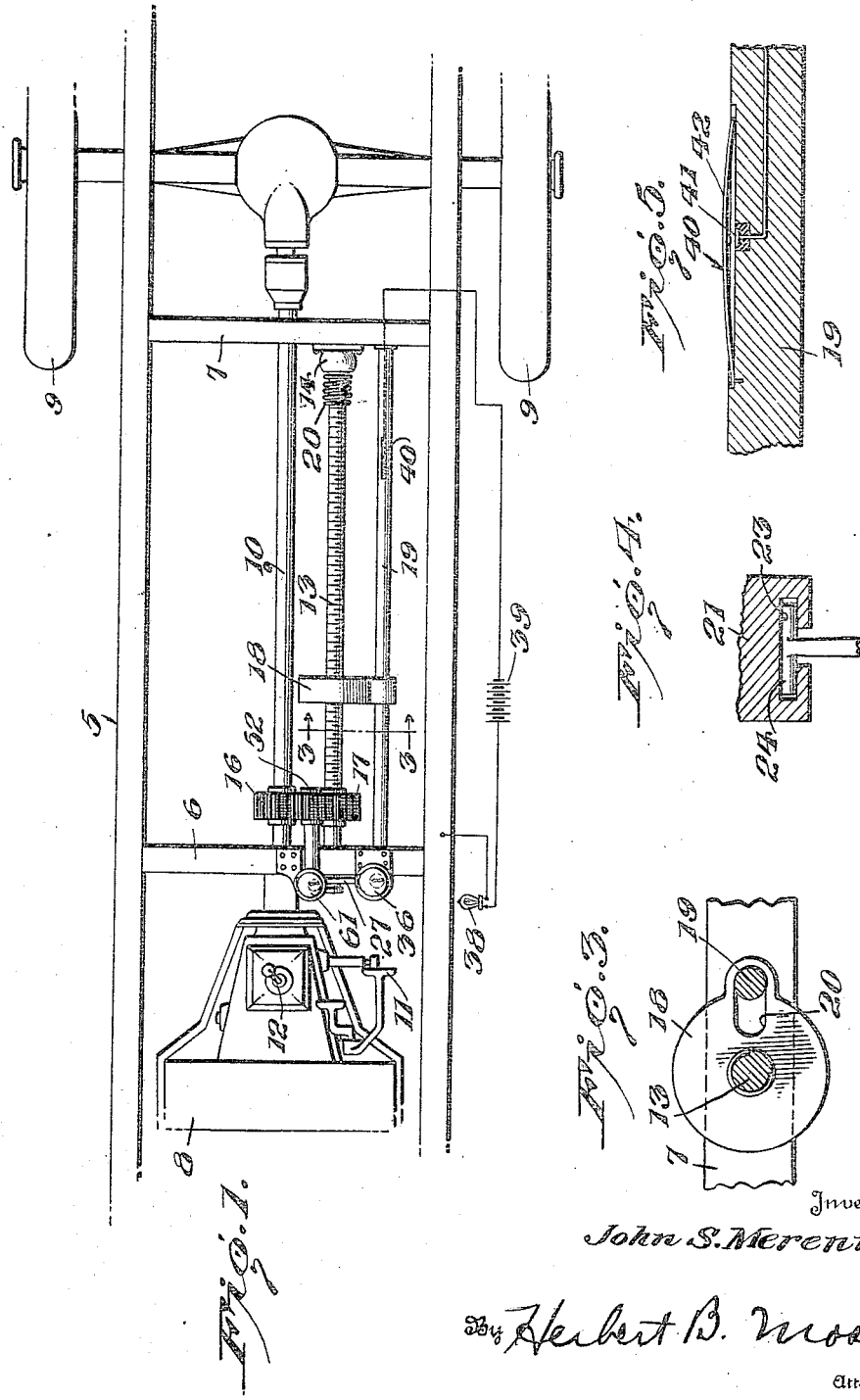

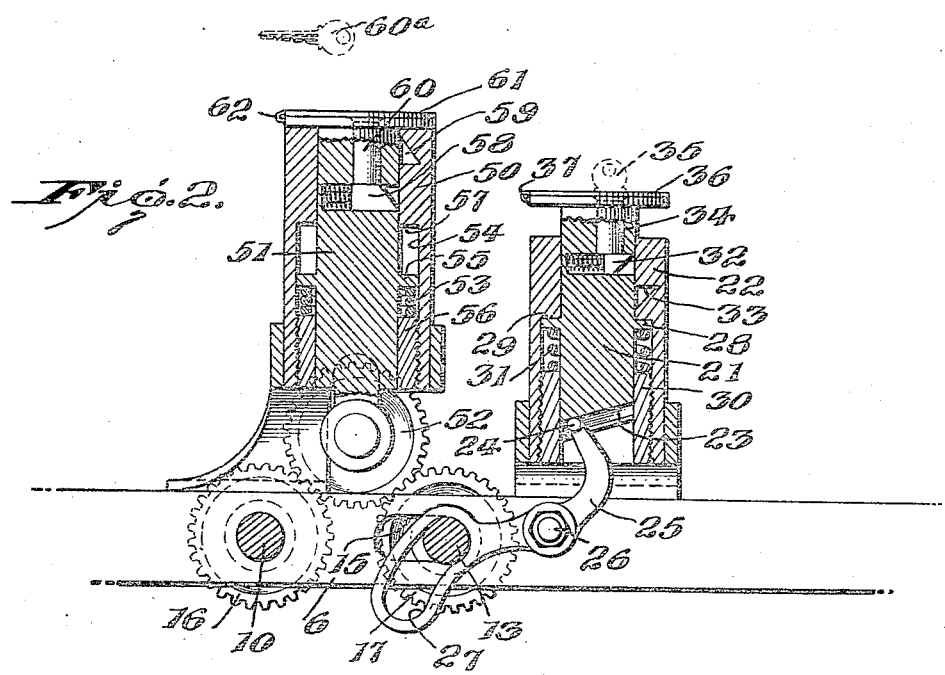
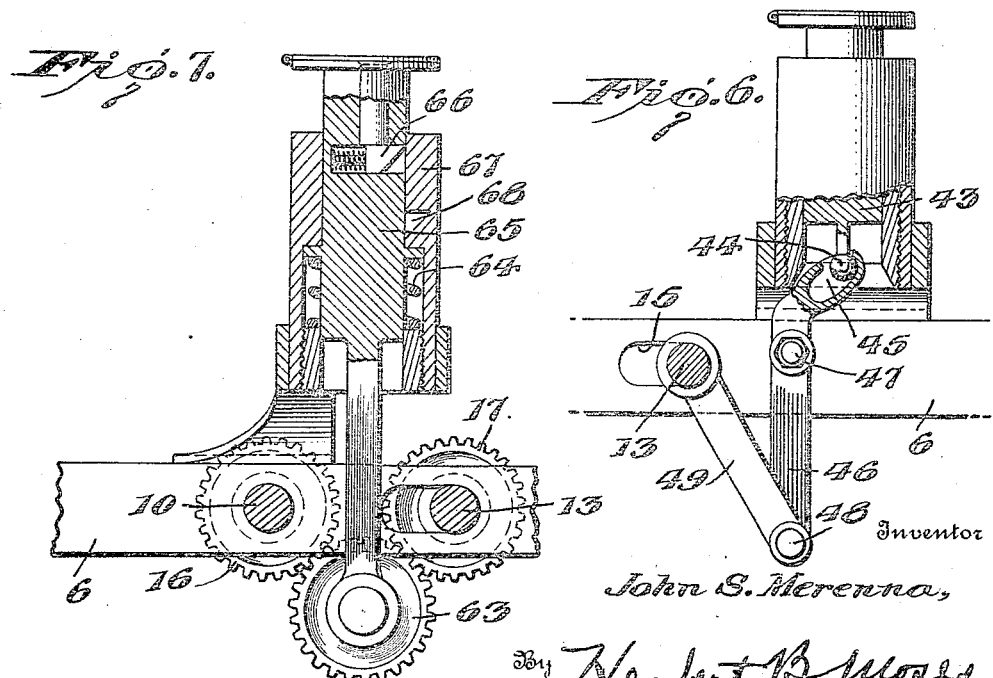

1,539,498

UNITED STATES PATENT OFFICE.

JOHN S. MERENNA, OF BROOKLYN, NEW YORK, ASSIGNOR OF THIRTY-FIVE ONE-HUNDREDTHS TO ABRAHAM SPINNER, OF BROOKLYN, NEW YORK, AND FIFTEEN ONE-HUNDREDTHS TO HERBERT B. MOSES, OF WASHINGTON, DISTRICT OF COLUMBIA.

AUTOMOBILE LOCK.

Application filed February 20, 1923. Serial No. 620,238.

*To all whom it may concern:*

Be it known that I, JOHN S. MERENNA, a citizen of the United States, residing at Brooklyn, in the county of Kings and State of New York, have invented a new and useful Automobile Lock, of which the following, when taken in connection with the accompanying drawings, is a specification.

This invention relates to new and useful improvements in locking mechanisms for automobiles.

In the majority of cities and towns at the present time, the police and fire department regulations require automobile locks to be of such a character as will permit the machine to be moved at least a short distance in case of a fire or other emergency. It is also within general knowledge, that many automobile owners store their machines in public garages and without locking the machine so as to permit a garage operator to run the automobile from its place of storage to the place where it is to be washed, and after washing to return it to its place of storage, and also to permit of delivering the machine to the owner's home, and of running it therefrom to the garage where it is to be stored. Advantage is often taken of this situation by garage owners and workmen to appropriate these private machines for their own personal use.

It is, therefore, the principal object of my invention to provide a locking mechanism for automobiles which will not only meet the requirements of police and fire departments, but which will also prevent unauthorized use of a machine by a garage operator or other person, and yet permit of limited use of the automobile after the locking device has been set.

Another object of the invention is to provide a locking mechanism for automobiles which, after being set by the owner, will automatically become effective immediately upon the machine travelling a predetermined distance, thus preventing the machine from being stolen or used without the authorization of the owner, by being run under its own power, or by being towed after the locking mechanism has become effective.

Another object of the invention is to provide means whereby the locking mechanism may be released and returned to its initial position.

A further object of the invention is to provide a locking mechanism for the purpose described and a signal which will become effective automatically to warn the owner should the locking mechanism be negligently left in operative connection.

In the drawings, which show one embodiment of my invention:

Figure 1 is a partial plan view of an automobile chassis showing the application of my invention;

Figure 2 is a detail view showing the foot-controlled mechanisms for the locking mechanism;

Figure 3 is a detail sectional view taken on the line 3—3 of Figure 1;

Figure 4 is a detail sectional view showing the connection between the foot-operated plunger and the lever;

Figure 5 is a detail longitudinal sectional view through the guide rod showing the circuit closer for the signal;

Figure 6 is a detail view somewhat similar to Figure 2, but showing a modification thereof; and Figure 7 is a sectional view showing a modification of the foot-controlled return means for the locking mechanism.

Referring to the drawings, 5 indicates an automobile chassis or frame which includes the front and rear transverse braces 6 and 7 respectively. An engine 8 is supported on the chassis for driving the rear wheels 9—9 through the medium of a main drive shaft 10 controlled by a clutch 11 and gear shift 12. The above parts are common to automobile structures and form no part of my invention per se.

My invention involves a mechanism which co-operates with and forms a combination therewith to lock the driving mechanism against further movement upon the completion of a predetermined number of revolutions of said driven wheels. To this end I provide a threaded counter-shaft 13, arranged substantially parallel with the main drive shaft 10, and having its rear end pivoted as at 14 to the rear transverse brace 7, the front end thereof projecting through an elongated opening 15 formed in the front transverse brace 6. A gear 16 is fixed to the main drive shaft 10 and a gear 17 is fixed to the counter-shaft 13, the gears meshing with each other when the counter-shaft is swung towards said main shaft, and becoming disconnected when the counter shaft is swung away from said main shaft. A locking element 18 has threaded engagement with the counter shaft and is adapted to be moved therealong upon rotation of said counter shaft. In order to prevent the locking element from rotating with the counter shaft, a guide rod 19 is provided. This rod parallels the counter shaft and has its ends fixed to the frame braces 6 and 7, the rod passing through and having sliding engagement with an elongated horizontal opening 20 formed in the locking element, said opening serving to permit the lateral swinging of the counter shaft without buckling the guide rod.

It will thus be seen that when the counter shaft 13 has been swung towards the main drive shaft 10, and the gears 16 and 17 thereby engaged with each other, the rotation of the drive shaft 10 will cause rotation of the counter shaft 13 and cause the locking element 18 to be moved bodily along the counter shaft towards the rear brace 7. The pivot 14 of the counter shaft is preferably formed of a ball and socket connection, the socket being fixed to the brace 7 and the ball being fixed to the rear end of the counter shaft. The socket is, therefore, in effect, a part of the frame or chassis, and, as the locking element 18 is moved rearwardly, it will ultimately contact with the socket and consequently with the frame or chassis. Inasmuch as the rotation of the counter shaft tends to constantly move the locking element rearwardly while the socket of the pivot 14 tends to stop such movement of the locking element, the resultant action will be the jamming of the locking element against said socket or frame and thereby stop further rotation of the counter shaft 13, as well as the driving mechanism of the automobile.

The length of the counter shaft 13, or the pitch of the threads thereon, or both, may be so chosen that the automobile may travel a predesired distance before it is locked against further movement. Thus it will be seen that after the locking mechanism has been connected with the power-operated driving mechanism, the locking element 18 being at this time adjacent the gear 17, the automobile may be operated under its own power for a predetermined distance, and when the end of this distance has been reached, the locking element 18 will co-operate with the socket or frame and thereby automatically lock the driving wheels against further movement and stall the engine if allowed to remain connected; while with the engine either connected to or disconnected from the driving wheels, the driving wheels are locked against forward rotation.

In order to prevent a sudden stopping of the automobile by means of the locking mechanism above described, I have provided a cushioning means, which, as shown, consists of a coil spring 20 surrounding the counter shaft 13 and located at the rear end thereof and directly in front of the socket member of the pivot 14, and preferably fastened thereto. Thus, as the locking member 18 is moved rearwardly, it will, at a short time prior to the end of its travel along the counter shaft, engage said spring or cushioning device and gradually compress the latter. This gradual cushioning action results in a corresponding retarded movement of the power-operated driving mechanism, so that the latter is ultimately stopped and locked in a rather easy manner. This cushioning means is very important, as otherwise the sudden stopping of the automobile by suddenly and positively locking the power driving mechanism, would have a tendency not only to strip gears, but also to damage other driving parts as will be readily understood.

In order to connect the locking mechanism with the power-operated driving mechanism, I have provided a mechanism which includes a foot-operated plunger 21 slidably mounted for vertical reciprocation in a casing 22, which is preferably fixed to the floor of the automobile in such a position that the driver may have ready access thereto. The lower end of the plunger is formed with a transversely disposed keyhole slot 23 which receives the T-head 24 fixed to the upper end of a bell-crank lever 25. This lever 25 is fulcrumed at its angle, as at 26, to the forward brace 6. The other end of the lever terminates in a cam slot 27 which embraces the forwardly projecting end of the counter shaft 13.

It is desirable to retain the counter shaft 13 normally in a disconnected relation to the main drive shaft 10, and in this normal position, the counter shaft and its controlling means will be in the position shown in Figure 2. In this position the plunger 21 is disposed at the upper extreme limit of movement. The upward movement is limited by the laterally extending flange 28 formed on the plunger co-operating with the shoulder 29 formed interiorly of the casing as a result of a counter bore. The lower end portion of the counter bore is threaded for engagement with a bushing 30, which terminates at its upper end in spaced relation to the shoulder 29. Between the bushing and the flange is disposed a coil spring 31 which surrounds the plunger and constitutes means for automatically raising the plunger and returning the counter shaft to its normal or ineffective position upon release of the plunger by the driver.

It is desirable to lock the manually controlled means in effective position, and to this end I provide the plunger 21 with a spring actuated lock bolt 32, which is adapted to co-operate with a seat 33 therefor formed in the casing, and thereby automatically lock said parts when the plunger has been depressed the required distance. A suitable key-hole 34 is formed in the plunger and extends upwardly through the upper end thereof and is adapted to receive a key 35 when it is desired to release said locking mechanism from the wheels. A cover plate 36 is pivoted at 37 to the upper end of the plunger and serves to guard the key-hole 34 against the ingress of dirt.

In case the owner of the automobile should negligently leave the locking mechanism connected, I provide a signal which will automatically warn him of this condition. This signal preferably includes an indicator 38, such as an electric lamp or bell. The circuit for the lamp or bell includes a battery 39, and a circuit closer 40 mounted on the guide rod 19, and adapted to be actuated by the locking element 18, said circuit closer consisting of a fixed contact plate 41 and a spring contact plate 42, which is depressed in contact with the part 41 when the part of the locking element 18 which surrounds the shaft 19 passes thereover. One lead of this circuit is connected to the fixed insulated contact plate 41 of the circuit closer, and the other lead is grounded on the chassis, the spring contact plate 42 normally extending beyond the periphery of the counter shaft so as to be engaged by the locking element. This circuit closer is preferably arranged at a sufficient distance in advance of the rear end of the guide rod so as to be closed and give warning to the owner at a time sufficient for him to release the locking mechanism before the automobile is automatically stopped.

In the modification shown in Figure 6, the plunger 43 is formed on its lower end with a ball 44 engaging in an elongated socket 45 formed in the upper end of a lever 46, which is fulcrumed at 47 on the front brace 6. The other end of the lever 46 is pivotally connected, as at 48, to one end of a link 49, the other end of the link 49 being pivotally connected to the counter shaft 13, to move the counter shaft 13 relatively to the drive shaft 10.

Other warning device may be used; for example, if desired the horn with which practically every automobile is now equipped may be operated by my device to give the warning, and likewise the battery with which practically every automobile is now equipped may be used to supply the energy therefor.

In order for the owner of the automobile to release the locking mechanism, and to return the locking element 18 to its initial position without the necessity of reversing the automobile, I have provided the following mechanism: Fixed to the floor of the automobile adjacent the manually controlled locking means, is a casing 50 having a plunger 51 slidably mounted therein for vertical movements. An idle gear 52 is journaled on the lower end of the plunger and is adapted to engage the gears 16 and 17 when the latter are separated so as to reverse the rotation of the counter shaft 13 and thereby release the locking mechanism, and return the locking element 18 to its initial position adjacent the gear 17. The idle gear 52 is normally held disengaged from the gears 16 and 17 by a spring 53 which surrounds the plunger and is positioned in a counter bore 54 of the casing between peripheral shoulder 55 formed on the plunger and a bushing 56 located in the lower end of the counter bore. The counter bore forms a resultant annular shoulder 57 for limiting the upward movement of the plunger. It is desirable to automatically lock this lock-releasing mechanism in its normal or dis-engaged position, and to this end I have provided the plunger 51 with a spring-actuated lock-bolt 58 which is shaped to co-operate with a seat 59 formed in the casing. A suitable key-hole 60 for a key 60ᵃ is formed in the upper end of the plunger and leads to the lock-bolt 58. A cover-plate 61 is pivoted at 62 to the upper end of the plunger to guard the key-hole against the ingress of dirt. Normally, the upper end of the plunger projects above the casing, and in this position the plunger is locked, the spring 53 is expanded, and the idle gear is disconnected from the gears 16 and 17. When the owner desires to release the locking mechanism, he retracts the lock bolt 58 with the key 60ᵃ and depresses the plunger 51 with his foot until the idle gear 52 meshes with the gears 16 and 17. Power being applied to the main shaft 10, the counter shaft 13 will be rotated in the reverse direction and the locking element 18 will be released from its frictional engagement with the cushioning spring 20 and then returned to its initial position adjacent the gear 17. The operator then removes his foot from the plunger and the spring 53 will return the parts to their normal position, the lock-bolt automatically seating itself in the seat 59 and thereby locking said releasing mechanism out of engagement.

In the modification illustrated in Figure 7, the releasing mechanism functions in an opposite manner to that shown in Figure 2. In this form the idle gear 63 is normally disposed under the gears 16 and 17 and the spring 64 which surrounds the plunger 65 serves to automatically cause the idle gear 63 to move into mesh with the gears 16 and 17 as soon as the locking bolt 66 is released from the casing 67, the locking bolt 66 and seat 68 therefor being reversed from the arrangement shown in Figure 2.

From the foregoing, it will be seen that should the owner of the automobile park the same, it will be impossible for a person to steal the car by operating it under its own power, or by towing, as the locking mechanism, when connected with the driving wheels or rather the drive shaft, will effect the locking of the latter upon the completion of a predetermined number of revolutions of said driven wheels. This locking mechanism is of such a character as to permit a garage operator to deliver the automobile to the owner's residence, providing the distance is not beyond the capacity of the locking mechanism, which capacity may be predetermined by a proper choice of the length of the counter shaft and the pitch of the thread thereof.

When the locking mechanism becomes effective, the owner may unlock the releasing mechanism and connect the same to the power operated driving mechanism and thereby return the locking element to its initial position, after which the releasing mechanism will be locked in its disengaged position. By thus locking the releasing mechanism, only the owner or one authorized to use the automobile can release the locking mechanism and thereby operate the automobile in the customary manner.

It is understood, that when so desired, the approach of the locking means 18 to its initial position may be announced by an alarm like that before described, and that a cushioning means may be used at the forward end of the shaft 13. Thus the locking member 18 may be set for movement in either direction for subsequent locking of the automobile, or alternately, first in one direction and then in the other; that is, if run substantially to locking limit in one direction it will then be in practically initial position for movement in the other direction for subsequent locking. Furthermore, when the length of the shaft 13 and the threads thereon are so proportioned that the automobile may travel a certain distance after the lock has been set for subsequent locking, and with the locking member 18 at an end of the shaft 13 or substantially at an end thereof, the distance that the automobile may travel may be set at any part of the before-mentioned certain distance merely by adjusting and locking the member nearer to its final position by the means above described; for example, if it is desired to have the automobile locked after travelling one-half of this before-mentioned certain distance, the locking member 18 is set at about the middle of the shaft 13.

Obviously, it will be a matter of convenience to have the same key effect the unlocking of both plungers, as those designated 21 and 51, or their equivalents, in the modifications which fall within the scope of this invention.

Having described my invention, what I desire to secure by Letters Patent of the United States, and what I claim is:

1. In an automobile locking mechanism, the combination with a driven wheel, of a power-operated mechanism for driving said wheel, and manually controlled means operable from the driver's seat for effecting the locking of said power-operated driving mechanism against further movement upon the completion of a predetermined number of revolutions of said driven wheel, said manually-controlled means including a locking member carried by a counter shaft mounted in parallel relation with said power-operated mechanism.

2. In an automobile locking mechanism the combination with a drive shaft of a power-operated mechanism for driving said shaft, and manually controlled means operable from the driver's seat for effecting the locking of said shaft against further movement upon the completion of a predetermined number of revolutions of said driven shaft, said manually controlled means including a locking member carried by a counter shaft mounted in parallel relation with said driven shaft and capable of being moved with said shaft, and means for moving the locking means into operative engagement with driven shaft.

3. In a device as set forth in claim 2, in which the counter shaft is threaded.

4. In a device as set forth in claim 2, in which both the counter shaft and driven shaft carry a gear wheel.

5. In a device as set forth in claim 2 in which the counter shaft carries cushioning means.

6. An automobile locking mechanism comprising a propelling shaft in combination with a locking member, means operable from the driver's seat for setting said locking mechanism into actuation, said locking member traversing a counter shaft mounted in juxtaposition to said propelling shaft when in operative engagement with said propelling shaft.

7. An automobile locking mechanism comprising a propelling shaft in combination with a locking mechanism, means operable from the driver's seat for setting said locking mechanism into actuation, said locking mechanism comprising a counter shaft, a locking element mounted for travel thereon, and means for guiding the locking element during its travel thereon.

8. An automobile locking mechanism comprising a propelling shaft in combination with a manually controlled means operable from the driver's seat for effecting the locking of said shaft against further movement upon the completion of a predetermined number of revolutions of the propelling shaft, said means comprising a threaded counter shaft, a locking element having threaded engagement with said counter shaft and capable of traversing said counter shaft when in operative engagement with propelling shaft to ultimately lock said last named shaft against movement, and means for retaining said locking element against rotation with respect to propelling shaft when traversing said counter shaft.

9. An automobile locking mechanism comprising a propelling shaft in combination with a locking member operable from the driver's seat, said locking member being mounted on a threaded counter shaft in juxtaposition to said propelling shaft, means for moving said counter shaft into operative relation with propelling shaft, and means for allowing only longitudinal movement of the locking member when in operative relation with said propelling shaft.

10. An automobile locking mechanism comprising a propelling shaft in combination with a locking member operable from the driver's seat, said locking member mounted on a threaded counter shaft in juxtaposition to said propelling shaft, means for moving said counter shaft into operative relation with propelling shaft, and a guide rod for allowing only longitudinal movement of the locking member when in operative relation with said propelling shaft.

11. An automobile locking mechanism comprising a propelling shaft in combination with a locking member, said locking member mounted on a threaded counter shaft in juxtaposition to said propelling shaft, means for moving said counter shaft into operative relation with the propelling shaft, means for allowing only longitudinal movement of the locking member when in operative relation with said propelling shaft, and means for warning the operator prior to the time the locking member becomes effective.

12. An automobile locking mechanism comprising a propelling shaft in combination with a locking mechanism, means operable from the driver's seat for setting said locking mechanism into actuation, said lock-mechanism comprising a counter shaft, a locking element mounted for travel thereon, and a guide rod.

13. An automobile locking mechanism comprising a propelling shaft in combination with a locking mechanism, said locking mechanism comprising a counter shaft, a locking element mounted for travel thereon, a guide rod, and a warning signal operatively connected with said locking mechanism to become effective prior to the time the locking element becomes effective.

14. An automobile locking mechanism comprising a propelling shaft in combination with a locking mechanism, means operable from the driver's seat for setting said locking mechanism into actuation, said locking mechanism comprising a counter shaft, a locking element mounted for travel thereon in one direction for a predetermined distance, means for moving said counter shaft in operative relation with the propelling shaft, means for automatically returning said locking mechanism to its ineffective position, and means for causing the locking element to travel in the opposite direction for a predetermined distance.

15. An automobile locking mechanism comprising a propelling shaft in combination with a locking mechanism, said locking mechanism comprising a counter shaft, a locking element mounted for travel thereon in one direction for a predetermined distance, means for moving said counter shaft in operative relation with the propelling shaft, means for automatically returning said locking mechanism to its ineffective position, means for causing the locking element to travel in the opposite direction for a predetermined distance, and means for warning the operator prior to the time the locking member becomes effective.

16. An automobile locking mechanism comprising a propelling shaft in combination with a locking member, means operable from the driver's seat for setting said locking mechanism into actuation, said locking member being capable of movement for a predetermined distance in opposite directions.

17. An automobile locking mechanism comprising a propelling shaft in combination with a locking member, means operable from the driver's seat for setting said locking mechanism into actuation, said locking member being adapted for movement in opposite directions, and means for moving the locking member into operative engagement with the propelling shaft.

18. An automobile locking mechanism comprising a propelling shaft in combination with a locking mechanism, said locking mechanism comprising a counter shaft, a locking element mounted for travel thereon, and a guide rod, and a manually controlled means including a foot-operated plunger and a lever for moving the locking mechanism into operative engagement with the propelling shaft to retain the propelling shaft against further movement upon the completion of a predetermined number of revolutions.

19. An automobile locking mechanism comprising a propelling shaft in combination with a locking mechanism, said locking mechanism comprising a counter shaft, a locking element mounted for travel thereon, and a guide rod, and a manually controlled means including a lock casing, a foot-operated plunger, and a key-releasable lock-bolt carried by the plunger and co-operating with said casing to lock the plunger in its effective position for moving the locking mechanism into operative relation with the propelling shaft.

20. An automobile locking mechanism comprising a propelling shaft in combination with a locking mechanism, said locking mechanism comprising a counter shaft, a locking element mounted for travel thereon, and a guide rod, a manually controlled means, including a foot-operated plunger and a lever for moving the locking mechanism into operative engagement with the propelling shaft to retain the propelling shaft against further movement, and means to release said locking mechanism.

21. An automobile locking mechanism comprising a propelling shaft in combination with a locking mechanism, said locking mechanism comprising a counter shaft, a locking element mounted for travel thereon, and a guide rod, means manually controlled for moving the locking mechanism into operative engagement with the propelling shaft, and means co-operating with said manually controlled means for returning the manually controlled means to normal position.

22. An automobile locking mechanism comprising a propelling shaft in combination with a locking mechanism, said locking mechanism comprising a counter shaft, a locking element mounted for travel thereon, and a guide rod, a manually controlled means including a lock casing, a foot-operated plunger, and a key-releasable lock-bolt carried by the plunger and co-operating with said casing to lock the plunger in its effective position for moving locking mechanism into operative relation with the propelling shaft, and power-operated means to release said locking mechanism.

23. In an automobile locking mechanism, the combination with a driven wheel, of a power-operated mechanism for driving said wheel, manually controlled means for effecting the locking of said power-operated driving mechanism against further movement upon the completion of a predetermined number of revolutions of said driven wheel, and a warning signal operatively connected with said manually controlled means to become effective prior to the time the locking means becomes effective.

24. In an automobile locking mechanism, the combination with a driven wheel, of a power operated mechanism, including a main drive shaft for driving said wheel, and manually controlled means for effecting the locking of said power-operated driving mechanism against further movement upon the completion of a predetermined number of revolutions of said driven wheel, said locking mechanism including a threaded counter shaft normally disconnected from said main drive shaft, a locking element having threaded engagement with said counter shaft and movable lengthwise thereof when the latter is connected to said drive shaft to ultimately lock the latter against movement, means for retaining said locking element against rotation relative to said counter shaft during the lengthwise movement of said element, and a manually controlled means operable from the driver's seat for connecting said counter shaft with said drive shaft.

25. In an automobile locking mechanism, the combination with a driven wheel, of a power-operated mechanism, including a main drive shaft for driving said wheel, and manually controlled means for effecting the locking of said power-operated driving mechanism against further movement upon the completion of a predetermined number of revolutions of said driven wheel, said locking mechanism including a threaded counter shaft normally disconnected from said main drive shaft, a locking element having threaded engagement with said counter shaft and movable lengthwise thereof when the latter is connected to said drive shaft to ultimately lock the latter against movement, a guide rod extending substantially parallel with said counter shaft and having relative sliding engagement with said locking element to retain the latter against rotation relative to said counter shaft during the lengthwise movement of said element, and a manually controlled means operable from the driver's seat for connecting said counter shaft with said drive shaft.

26. In an automobile locking mechanism, the combination with a driven wheel, of a power-operated mechanism, including a main drive shaft for driving said wheel, and manually controlled means for effecting the locking of said power-operated driving mechanism against further movement upon the completion of a predetermined number of revolutions of said driven wheel, said locking mechanism including a gear fixed on said drive shaft, a threaded counter shaft arranged substantially parallel thereto and having one end pivoted, a gear fixed to said counter shaft and normally disconnected from the gear on the drive shaft, a locking element having threaded engagement with said counter shaft and movable lengthwise thereof when the latter is connected to said drive shaft to ultimately lock the latter against movement, means for retaining said locking element against rotation relative to said counter shaft during the lengthwise movement of said element, and a manually controlled means for swinging said counter shaft to connect the gears of the main and counter shafts.

27. In an automobile locking mechanism, the combination with a driven wheel, of a power-operated mechanism for driving said wheel, manually controlled means for effecting the locking of said power-operated driving mechanism against further movement upon the completion of a predetermined number of revolutions of said driven wheel, and means for cushioning the locking action on said power-operated means.

28. In an automobile locking mechanism, the combination with a driven wheel, of a power-operated mechanism, including a main drive shaft for driving said wheel, and manually controlled means for effecting the locking of said power-operated driving mechanism against further movement upon the completion of a predetermined number of revolutions of said driven wheel, said locking mechanism including a counter shaft normally disconnected from said main drive shaft, a locking element actuated by said counter shaft when the latter is connected to said drive shaft to ultimately lock the latter against movement, manually controlled means for connecting said counter shaft with said drive shaft, and means co-operating with said locking element to cushion the locking action on said drive shaft.

29. In an automobile locking mechanism, the combination with a driven wheel, of a power-operated mechanism, including a main drive shaft for driving said wheel, and manually controlled means for effecting the locking of said power-operated driving mechanism against further movement upon the completion of a predetermined number of revolutions of said driven wheel, said locking mechanism including a threaded counter-shaft normally disconnected from said main drive shaft, a locking element having threaded engagement with said counter shaft and movable lengthwise thereof when the latter is connected to said drive shaft to ultimately lock the latter against movement, means for retaining said locking element against rotation relative to said counter shaft during the lengthwise movement of said element, a manually controlled means for connecting said counter shaft with said drive shaft, and a coil spring surrounding said counter shaft and co-operating with said locking element to cushion the locking action on said drive shaft.

30. In an automobile locking mechanism, the combination with a driven wheel, of a power-operated mechanism for driving said wheel, and manually controlled means including a foot-operated plunger and a lever for effecting the locking of said power-operated driving mechanism against further movement upon the completion of a predetermined number of revolutions of said driven wheel.

31. In an automobile locking mechanism, the combination with a driven wheel, of a power-operated mechanism for driving said wheel, manually controlled means including a foot-operated plunger and a lever for effecting the locking of said power-operated driving mechanism against further movement upon the completion of a predetermined number of revolutions of said driven wheel, and means co-operating with said plunger to return said manually controlled means to normal position.

32. In an automobile locking mechanism, the combination with a driven wheel, of a power-operated mechanism for driving said wheel, and manually controlled means for effecting the locking of said power-operated driving mechanism against further movement upon the completion of a predetermined number of revolutions of said driven wheel, said manually controlled means including a lock casing, a foot-operated plunger, and a key releasable lock-bolt carried by the plunger and co-operating with said casing to lock the plunger in its effective position.

33. In an automobile locking mechanism, the combination with a driven wheel, of a power-operated mechanism for driving said wheel, and manually controlled means for effecting the locking of said power-operated driving mechanism against further movement upon the completion of a predetermined number of revolutions of said driven wheel, said manually controlled means including a lock casing, a foot-operated plunger, and a key releasable lock-bolt carried by the plunger and co-operating with said casing to lock the plunger in its effective position, and a spring co-operating with said plunger to return the same to its initial position upon release of said lock-bolt.

34. In an automobile locking mechanism, the combination with a driven wheel, of a power-operated mechanism, including a main drive shaft for driving said wheel, and manually controlled means for effecting the locking of said power-operated driving mechanism against further movement upon the completion of a predetermined number of revolutions of said driven wheel, said locking mechanism including a foot-operated plunger, and a lever actuated by said plunger for effecting connection between the counter shaft and said main shaft.

35. In an automobile locking mechanism, the combination with a driven wheel, of a power-operated mechanism, including a main drive shaft for driving said wheel, and manually controlled means for effecting the locking of said power-operated driving mechanism against further movement upon the completion of a predetermined number of revolutions of said driven wheel, said locking mechanism including a foot-operated plunger, a lever actuated by said plunger for effecting connection between the counter shaft and said main shaft, a key-releasable lock for securing said plunger in its effective position, and a spring for returning said manually controlled means to ineffective position upon release of said lock.

36. In an automobile locking mechanism, the combination with a driven wheel, of a power-operated mechanism for driving said wheel, manually controlled means for effecting the locking of said power-operated driving mechanism against further movement upon the completion of a predetermined number of revolutions of said driven wheel, and power-operated means to release said locking means.

37. In an automobile locking mechanism, the combination with a driven wheel, of a power-operated mechanism for driving said wheel, manually controlled means for effecting the locking of said power-operated driving mechanism against further movement upon the completion of a predetermined number of revolutions of said driven wheel, and power-operated means to release said locking means, said releasing means including a key-actuated lock to normally retain said releasing means disconnected from said power-operated mechanism.

38. In an automobile locking mechanism, the combination with a driven wheel, of a power-operated mechanism, including a main drive shaft for driving said wheel, and manually controlled means for effecting the locking of said power-operated driving mechanism against further movement upon the completion of a predetermined number of revolutions of said driven wheel, said locking mechanism including a counter shaft normally disconnected from said main drive shaft, a locking element actuated by said counter shaft when the latter is connected to said drive shaft to ultimately lock the latter against movement, and a manually controlled means operable from the driver's seat for connecting said counter shaft with said drive shaft, and means normally disconnected from said power-operated mechanism and including a manually actuated device for mechanically connecting said main shaft and drive shaft to release said locking element and return the same to its initial position.

39. In an automobile locking mechanism, the combination with a driven wheel, of a power-operated mechanism, including a main drive shaft for driving said wheel, and manually controlled means for effecting the locking of said power-operated driving mechanism against further movement upon the completion of a predetermined number of revolutions of said driven wheel, said locking mechanism including a pivoted counter shaft, a gear fixed thereon, a gear fixed to said drive shaft, means to swing said counter shaft to connect said gears, a locking element actuated by said counter shaft when the latter is connected to the drive shaft to ultimately lock the latter against movement, and manually controlled means operable from the driver's seat to release said locking element and to return it to its initial position.

40. In an automobile locking mechanism, the combination with a driven wheel, of a power-operated mechanism, including a main drive shaft for driving said wheel, and manually controlled means for effecting the locking of said power-operated driving mechanism against further movement upon the completion of a predetermined number of revolutions of said driven wheel, said locking mechanism including a pivoted counter shaft, a gear fixed thereon, a gear fixed to said drive shaft, means to swing said counter shaft to connect said gears, a locking element actuated by said counter shaft when the latter is connected to the drive shaft to ultimately lock the latter against movement, and manually controlled means to release said locking element and to return it to its initial position, said manually controlled means including an idle gear adapted to mesh with both of said other gears and reverse the rotation of said counter shaft.

41. In combination, a vehicle, and reciprocating means to lock said vehicle against movement after a predetermined distance has been travelled by the vehicle, means to cause said reciprocating means to effect locking of wheels on both sides of said vehicle after moving a given distance in one direction, and means to cause said locking means to effect locking thereof after moving a given distance in the other direction.

42. In combination, a vehicle, and reciprocating means to lock said vehicle against movement after a predetermined distance has been travelled by the vehicle, means to cause said reciprocating means to effect locking of wheels on both sides of said vehicle after moving a given distance in one direction, means to cause said locking means to effect locking thereof after moving a given distance in the other direction, and means to vary the predetermined distance that is travelled before the vehicle is locked against movement.

JOHN S. MERENNA.